United States Patent [19]
Goldstein

[11] 3,777,606
[45] Dec. 11, 1973

[54] ZIPPER CUTTING APPARATUS
[76] Inventor: Barry Goldstein, 17 Allen Rd., Rockville Centre, N.Y. 11570
[22] Filed: Jan. 13, 1972
[21] Appl. No.: 217,533

[52] U.S. Cl.......................... 83/460, 83/620, 83/921
[51] Int. Cl............................................. B26d 7/02
[58] Field of Search................. 83/460, 620, 925 A, 83/921

[56] References Cited
UNITED STATES PATENTS

| | | | |
|---|---|---|---|
| 1,817,428 | 8/1931 | Tokamatsu | 83/620 X |
| 2,255,846 | 9/1941 | Grammer | 83/620 X |
| 3,010,351 | 11/1961 | Firing | 83/921 X |
| 2,708,968 | 5/1955 | Soave | 83/921 X |

Primary Examiner—Andrew R. Juhasz
Assistant Examiner—Leon Gilden
Attorney—Barry Evans

[57] ABSTRACT

A cutting assembly is disclosed for use in a device adapted to remove a predetermined length of zipper teeth from a zipper chain, wherein all portions of the teeth in the length of chain are removed. The device includes a press having a base across which completed zipper chain passes in a predetermined path of travel and a cutting assembly support head which is positioned above the base and mounted for reciprocation in a vertical direction with respect to the base above the path of travel of the zipper chain. The cutting assembly is mounted on the support head for reciprocal movement therewith and includes a plurality of cutting blades having independent cutting edges. These blades are operatively interconnected with their cutting edges cooperating to define a generally rectangular cutting member having a width larger than the width of the zipper teeth in the zipper chain so that as the support head is reciprocated towards the base, the cutting edges of the cutting assembly engage the zipper chain and cut through the chain and the zipper teeth thereon to sever and remove a rectangular section from the zipper chain.

13 Claims, 7 Drawing Figures

PATENTED DEC 11 1973 3,777,606

ZIPPER CUTTING APPARATUS

The present invention relates to a device for cutting zipper chains and more particularly to a device for removing a predetermined section of zipper teeth from a zipper chain.

In the manufacture of zippers, a completed zipper chain is initially formed from two tape sections interconnected by a plurality of zipper teeth on adjacent edges of each tape. The chains are manufactured in a continuous process so that each chain has a length of several hundred or more feet. This raw zipper chain must then be cut to various sizes for the particular applications to which the zipper is to be used. In this cutting process it is normally required that a segment of the teeth in each length of cut zipper chain be removed therefrom in order to permit the zipper slide and stopper to be connected to the individual zippers.

The removal of zipper teeth from each zipper length and the cutting of the zippers into the desired lengths presents difficult problems in the manufacture of zippers. These problems are particularly complex when dealing with zippers having zipper teeth formed from a continuous line of zig-zag shaped monofilament plastic. As is well known, in that type of zipper, the adjacent apices of the zig-zags, on adjacent zipper tapes, are interlocked by knobs formed at these apices with the opposed apices of each monofilament chain sewn to their respective tapes. Thus, in order to remove a segment of the zipper teeth from the zipper chain, it is necessary either to cut the zipper tape itself or, where this is undesirable, to remove only a portion of the zipper teeth.

Previously proposed cutting arrangements have been found to be incapable of cutting the zipper tapes without causing shredding or fraying of the zipper tape adjacent the location of the removed zipper teeth section. This type of fraying is disadvantageous in that it makes it difficult to insert the zipper slide on the cut zipper section and the frayed threads from the zipper tapes often become snagged in the zipper slide during insertion and use of the slide. Thus, until the present invention, the industry has been forced to accept zipper lengths in which only the central portions of the zipper teeth of the monofilament zipper are removed. Zippers cut in this manner, however, have chips of plastic or monofilament thread secured to the uncut zipper tapes. These chips not only provide an unpleasant and rough feel to the zipper, but also, since they are secured to the zipper tapes by only one stitch, will readily fall from the zipper tape during insertion of the slide and use of the zipper itself. As a result, these chips tend to become clogged or jammed in the zipper slide, thereby rendering the zippers manufactured with this type of cut zipper chain inoperative.

Thus, although it is recognized that it would be desirable in the art to remove all of the zipper teeth within the cut out section, that has not heretofore been possible to a satisfactory degree. Moreover, the alternative course of removing only a portion of the teeth, which provides a somewhat better result, also has numerous disadvantages which result in numerous inoperative zippers thereby increasing the manufacturing costs and decreasing the profits from zipper manufacturing.

Accordingly, it is an object of the present invention to remove all of the teeth in a predetermined section of a zipper chain while avoiding the above-mentioned problems.

Yet another object of the present invention is to remove a predetermined section of zipper teeth from a zipper chain and to include in that removed section all portions of the zipper teeth, without causing fraying of the zipper tape to which the teeth are secured.

Yet another object of the present invention is to remove predetermined sections of zipper teeth from a zipper chain and to cut the zipper chain at predetermined locations, with the use of a cutting blade assembly and apparatus that is relatively simple and inexpensive in construction and efficient in operation.

In accordance with an aspect of the present invention, a device is provided in which a cutting assembly support head is mounted for reciprocation towards and away from a base plate across which a zipper chain passes along a predetermined path of travel. A zipper chain cutting assembly is mounted on the support head of the device for reciprocal movement therewith and is adapted to engage the zipper chain on the base to cut a predetermined section of the zipper chain and to sever the zipper chain across its width in order to form predetermined lengths of zipper chain for use in manufacturing pants, zippers or the like.

The cutting head assembly includes a plurality of cutting blades having independent cutting edges with the blades being operatively interconnected and positioned with their cutting edges cooperating to define a generally rectangular cutting member. One of the blades is at least as wide as the zipper chain to be cut and extends transversely of the path of travel of the zipper chain in order to sever the chain across its entire width as the cutting member is reciprocated down against the zipper chain. In addition to this one blade, the cutting assembly includes a pair of elongated relatively straight blades extending in the direction of travel of zipper chain and secured at one end to the one blade positioned in parallel spaced relation to each other. An end blade is provided which is secured to the elongated blades at the ends thereof opposite the one wide blade and spanning the space between them, in spaced parallel relation to the one wide blade, so that the four blades thereby define the generally rectangular cutting member with a rectangular cavity formed therebetween.

The two elongated blades are spaced from each other across the width of rectangular cutting member a distance which is larger than the width of the zipper teeth in the chain so that as the support head is reciprocated down towards the base the cutting edges engage the zipper chain, with the elongated blades cutting through the zipper tape on either side of the zipper teeth, the one wide blade cutting across both zipper tapes and the zipper teeth, and the remaining blade cutting across only the zipper teeth between the two elongated blades. In this manner, a generally rectangular section of the zipper teeth are cut from the zipper chain while, simultaneously, the zipper chain is severed across its width in order to cut the chain into lengths.

In one embodiment of the invention a spring biased clamping member is positioned in the rectangular cavity formed by the blades and extends beyond the cutting edges of the blades to engage the zipper chain and hold it against the base immediately prior to the cutting of the chain by the cutting assembly. As the cutting assembly is lowered, it moves downwardly with respect to the spring biased clamping member to cut the zipper tape, and in this manner the zipper chain is held stationary by the clamping member during the cutting operation. The spring biased member prevents the cut rectangular section from wedging between the blades. The cut section therefore drops off after leaving the press. Additionally, the base of the device may be provided with a generally rectangular groove therein complementary to the rectangular configuration of the cutting edges of the blades, in order to enhance the cutting action of the blades as they are pressed down against the zipper chain.

The above, and other objects, features and advantages of this invention will become apparent in the following detailed description of an illustrative embodiment thereof which is to be read in connection with the accompanying drawings, wherein.

Figure 1:
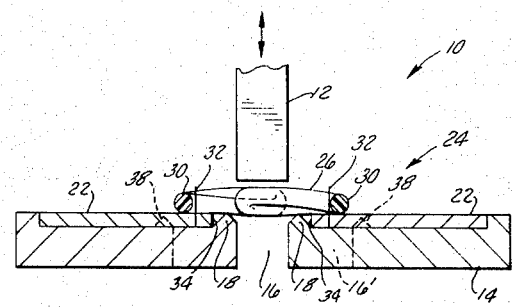
FIG. 1 is a schematic elevational view of a zipper cutting operation as performed by prior art devices.
Figure 2:
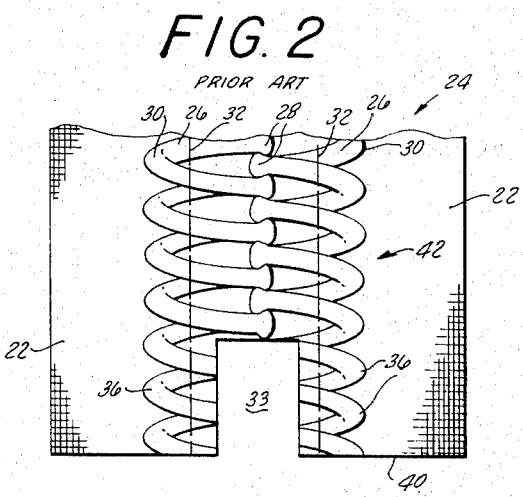
FIG. 2 is an enlarged plan view of a zipper chain cut by the apparatus of the prior art.

Referring to the drawing in detail, and initially to FIG. 1 thereof, a prior art device is schematically shown which has been utilized to cut predetermined segments of zipper teeth from a zipper chain formed with monofilament plastic zipper teeth. Typically, such apparatus includes a cutting block 12 which is power driven for reciprocation in a vertical direction, as indicated by the arrows, with respect to a platen 14 having an aperture 16 therein and a pair of spaced cutting edges 18. The platen includes an upper surface 20 which supports the cloth zipper tapes 22 used to form the completed zipper 24 illustrated in FIG. 2. Zipper tapes 22 are interconnected in a conventional manner by a pair of monofilament plastic threads 26, which are preformed in a conventional zig-zag configuration with enlargements 28 formed at one apex of each of the zig-zags, for interlocking the two threads in the completed zipper configuration. The opposed apices 30 of monofilament threads 26 are sewn to cloth tapes 22 by a thread 32 in a conventional manner.

As mentioned above, zipper chain is initially manufactured in lengths of hundreds of feet and must then be cut down into predetermined lengths as required for the manufacture of pants and the like. The end of each of the cut lengths of tape must have a predetermined number or length 33 of zipper teeth removed therefrom for insertion of the slide and zipper stop member. In most prior art applications the removal of these teeth is done before the chain is cut, in the manner illustrated in FIG. 1, with only a portion of the teeth in the predetermined segment 33 removed therefrom. This is done by manually positioning the zipper chain with cutting edges 18 adjacent the inner edges 34 of zipper tapes 22 and beneath monofilament teeth 26. Cutting block 12 then is reciprocated downwardly through space 16 between cutting edges 18 so as to shear the monofilament teeth 26 against the cutting edges 18. As a result, small segments or "chips" 36 of zipper teeth remain secured to the zipper tapes 22 adjacent the section 33 of removed teeth. These chips produce a rough feel to the zipper tape and tend to loosen from between the threads 32 which hold the zipper teeth on the zipper tape and become clogged or jammed in the zipper slide during operation and use of the zipper, thereby rendering the zipper useless or difficult to operate.

It has been contemplated that the prior art device of FIG. 1 could be utilized to remove an entire segment of the zipper, including portions of zipper tapes 22, by locating cutting edges 18 outwardly of the zipper teeth 26 (for example at points legend 38 and indicated in dotted lines in the drawing) while making cutting member 12 somewhat wider to fit between the larger space 16' thus formed. With such an arrangement, as block 12 moves downwardly into space 16', zipper tapes 22 are sheared against cutting edges 18 by the action of block 12 pulling teeth 26 down through space 16'. While this has the effect of removing all portions of teeth in section 33, the downward pull by block 12 against cutting edges 18, in order to cut tapes 22, causes the cut edges of the tapes to fray and spread from the body of the tapes themselves. This is also undesirable, in that these frayed edges interfere with the placement of the zipper slide and stop member on the cut length of zipper. In fact, it has heretofore been found preferable to take out only portions of the zipper teeth themselves, leaving chips 36, even with the disadvantages associated therewith, rather than to have fraying of the tape edges.

In addition, with the prior art devices, zipper chain 24 is usually cut manually in lengths along line 40 after the teeth are knocked out because prior art devices generally do not provide for automatically cutting the tape into lengths, while simultaneously removing the teeth or portions thereof. Moreover, in either method of operation of the prior art devices, a problem also exists in that as block 12 moves down into space 16, it tends to pull the monofilament thread forming teeth 26 down into that space. These threads, being plastic, do not immediately break and will in fact stretch under this pulling action. As a result, there is a tendency to pull the uncut teeth portions 42 with the portions of the teeth that are being cut and moved downwardly into the space 16 so that the ends 44 of the uncut zipper teeth were loosened or damaged. This tneds to destroy the integrity of usefulness of the uncut portions of the zipper.

Figure 3:
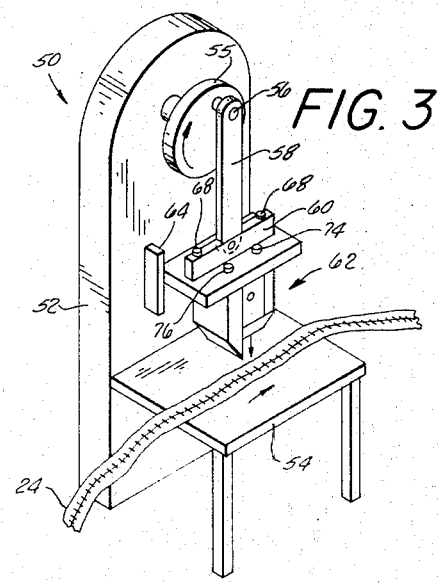
FIG. 3 is a schematic perspective view of a zipper cutting apparatus according to an embodiment of the present invention.

These disadvantages are overcome by the zipper cutting apparatus 50 of the present invention, one embodiment of which is illustrated in FIG. 3. Zipper cutting apparatus 50 comprises an operator operable press 52 having a base 54 along which the tape 24 is moved, either manually or automatically, along a predetermined path of travel. Press 52 includes a crank 55 rotatably driven by a motor (not shown) which is controlled either by the operator or automatically, to drive the crank through one revolution for each cutting operation.

Crank 55 is pivotally connected through the eccentrically mounted pin 56 to a pitman 58, which in turn is pivotally connected to a cutting assembly supporting head 60. A zipper cutting assembly 62 is rigidly secured to head 60, as more fully described hereinafter, and is guided by guide members 64, schematically illustrated in FIG. 3, for reciprocation in a straight line vertical direction upon rotation of crank 55.

Cutting assembly 62 includes a base plate 65 having a pair of apertures 66 therein through which the assembly is secured by bolts 68 to head 60. A plurality of cutting blades 69, 70 and 72 are secured to support plate 65 in a predetermined relation with their cutting edges in the same plane in order to give the cutting assembly a generally rectangular configuration for cutting a rectangular section from the zipper tape 24 upon reciprocation of the cutting assembly 62 against the tape on base 54.

Figure 6:
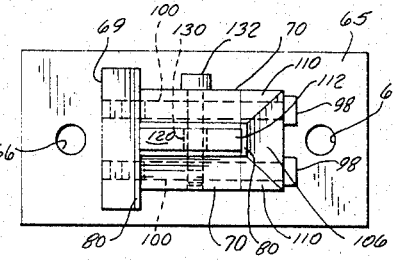
FIG. 6 is a bottom view of the cutting assembly taken along line 6—6 of FIG. 4.
Figure 5:
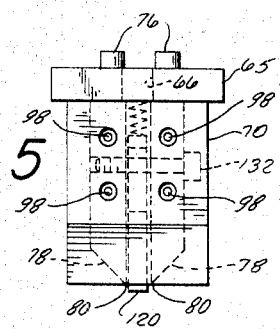
FIG. 5 is an end view of the cutting assembly taken along line 5—5 of FIG. 4.

Blade 69 is secured to plate 65 by a pair of bolts 76 which extend through plate 65 into the upper portion of the cutting blade. The latter is a relatively wide cutting member having a tapered cutting edge portion 78, the opposed sides of which converge to a free cutting edge 80 that is relatively flat and has a small finite width. The width of blade 69 itself, as seen in FIG. 6, is equal to or slightly larger than the width of tape 24 being cut and thus serves to cut the tape across its width at the end of the cut out section of teeth, as more fully described hereinafter.

Figure 7:
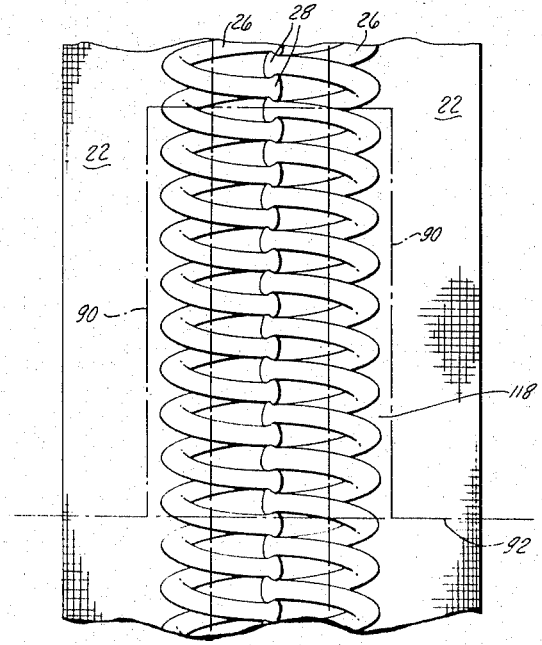
FIG. 7 is an enlarged plan view of a section of a zipper tape with the cut lines made by the cutting assembly of FIG. 4 indicated in phantom lines.

Blades 70 are identical in configuration and are mounted on plate 65 in spaced parallel relation with their ends 84 abutting against the inner surface 86 of blade 69. Blades 70 also include tapered cutting edge portions 78 which extend to free cutting edges 80 having a generally flat configuration and a small finite width. These blades form the long side of the rectangular cutting assembly 62 and are spaced from each other in their mounted configuration a distance greater than the width of the two joined monofilament threads 26 used to form the zipper, as illustrated in FIG. 7. In the operation of the device the cutting edges 80 of blades 70 form cuts 90 in zipper tapes 22, as indicated by phantom lines in FIG. 7, while the cutting edges 80 of blade 69 forms the cut line 92 across both tapes 22.

Cutting blade 72 closes the end of the rectangular cutting assembly 62 and is secured to plate 65, by bolts 94 which extend through plate 65 into the top of cutting member 72 and also is secured to cutting member 69 by four bolts 98 which extend through apertures 100 formed in the blades 70 which are threadedly engaged in threaded apertures 102. In this manner blades 70 are clamped between blades 72 and 69 and are held in a rigid configuration. Of course it is to be understood that other methods of securing each of the blades to the base 65 and to each other would occur to those skilled in the art.

Blade 72 includes a tapered end portion 106 which tapers inwardly, towards the flat inner side 108 of the blade, to the free cutting edge 80 of the blade, which also is relatively flat and has a small finite width. In addition, the side edges 110 of blade 72 are tapered inwardly towards each other, as illustrated in FIG. 6, to conform to the taper 78 of blades 70. Cutting edge 80 of blade 72 spans the space 112 between elongated blades 70 to close the rectangle and, in the operation of the device, forms a cut along phantom line 114 (FIG. 7).

It is thus seen that in the operation of the device, as cutting assembly 62 is reciprocated downwardly against tape 24, which is positioned between the cutting assembly and the base 54 upon which it rests, the cutting edges 80 of the various blades are caused to engage the tape and to cut zipper tapes 22 and teeth 26 along the phantom lines 90, 92 and 114. The crank 55 is driven rapidly and with great force in one revolution to perform the cuts with just one sharp blow from the cutting assembly. In this manner the generally rectangular segment 118 of zipper teeth and tapes are cut from the zipper chain itself while the zipper is severed along phantom line 92. By this arrangement, there is no pulling or shearing of the threads of the zipper tapes 22 from the main body of the tape (i.e., along the cut lines 90) so there will be little or no fraying of the tape threads along these edges to interfere with the insertion of the zipper slide or stop on the length of zipper tape. In addition, the entire configuration of the zipper teeth within the rectangular removed section 118 are removed from the zipper tape so that no chips remian to interfere with the operation of the zipper slide. This is a substantial advantage over the apparatus and cutting methods of the prior art which improves the zipper manufacturing process and reduces the number of zippers which will malfunction. Moreover, the zipper tape is automatically cut at the location of the removed section of tape as is desired in the manufacture of zippers, thereby avoiding the previously utilized manual cutting operation of the zipper tape into lengths.

In the operation of the device, the operator places the tape 24 in a predetermined position beneath the cutting assembly 62 and operates the motor (not shown) to drive the crank 55 through one rapid and forceful revolution to cause cutting assembly 62 to cut or chop out the segment 118 of the tape. The tape is thus severed along line 92 and the assembly 62 raises to its uppermost position. The operator then manually advances the tape 24 a predetermined distance, in accordance with the desired length of the zipper for use in manufacturing pants or the like, and again operates the motor to cause reciprocation of head 62, removal of the zipper section 118 and the severing of the zipper chain. It is noted that while a manual operation has been described, it is also contemplated that the zipper chain 24 could be advanced automatically.

Figure 4:
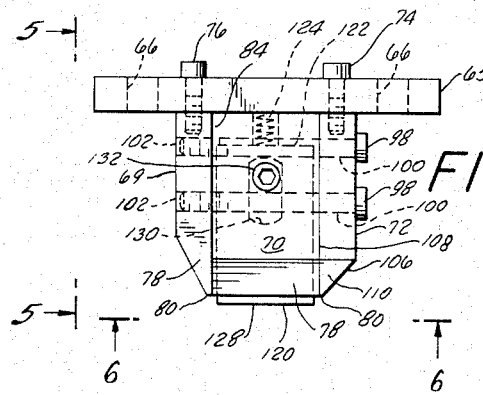
FIG. 4 is a side elevational view of the cutting assembly utilized in the apparatus of FIG. 3.

To enhance the operation of the device, a spring biased clamping member 120 may be inserted within space 112 formed between the cutting blades 69, 70 and 72. This clamping member is formed of a relatively hard material, such as metal or the like, in a generally rectangular configuration conforming in cross-section to the configuration of space 112. The upper end 122 of clamping member 120 is engaged by a compression spring 124 which is held against the lower surface 126 of plate 65. In this manner clamping member 120 is biased downwardly, as seen in FIG. 4, so that the free end 128 thereof will engage zipper tape 24 on base 54. The end 128 extends beyond cutting edges 80 of the cutting assembly so that it will engage zipper chain 24 before cutting edges 80. The clamping member thus serves to hold the zipper in a fixed position against movement on base 54 to insure that the rectangular section 118 of the zipper is accurately cut by the cutting edges. Because of the spring biased arrangement, the blades 69, 70 and 72, will move downwardly with respect to clamping member 120 after the clamping member has engaged the tape. In this manner the tape will be clamped before it is cut, but the cutting operation itself is not interfered with.

In order to limit the range of movement of clamping member 120 within cavity 112, the clamping member is provided with an elongated slot 130 through which a guide pin or bolt 132 extends. Bolt 132 is secured between the opposed elongated blades 70, as illustrated in FIG. 6, and is secured thereto by threaded engagement with one of the blades. Bolt 132 limits the downward and upward movement of the clamping member 120 by the engagement thereof with the edges of slot 130.

In addition to the above, it is contemplated that base 54 may have a rectangular groove (not shown) which would have a complementary configuration to the rectangular cutting assembly 62, i.e., to the cutting edges 80 of the various blades, in order to receive the blades on the downward stroke of the cutting assembly. This arrangement would assist the action of the cutting blades on the zipper chain by pinching the tape until it snaps and will avoid the pulling of the zipper tape threads and the plastic monofilament forming the zipper teeth, as occurs with previously proposed arrangements.

Accordingly, it is seen that a relatively simple and inexpensive apparatus is provided which is adapted to cut a generally rectangular section from a zipper tape in which all portions of the zipper tape within the section are removed without the undesirable fraying or spreading of the threads of the tapes forming the zipper as occurred with previously proposed embodiments. In addition, the single cutting assembly of the present invention simultaneously severs the tape chain adjacent the location of the removed teeth in order to cut the chain into predetermined lengths required for manufacturing pants or the like. Moreover, the apparatus of the present invention will operate on numerous types of zippers, preferably those having monofilament or plastic formed teeth, and will sever any fabric material zipper tapes to which the teeth are secured, including conventional woven zipper tapes and also knitted and double knitted zipper tapes, without fraying of the fabric along the severed edges.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A device for removing a predetermined length of zipper teeth from a zipper chain comprising, in combination, a press having a base across which zipper chain passes in a predetermined path of travel, a support head and means for reciprocating said support head in a vertical direction with respect to said base above said predetermined path of travel, and a zipper chain cutting assembly mounted on said support head for reciprocal movement therewith, said zipper cutting assembly including a plurality of cutting blades having independent cutting edges, said blades being operatively interconnected with said cutting edges cooperating to define a generally rectangular cutting member, the cutting edge of one of said blades extending beyond the rectangular cutting member defined by said one blade and the remainder of said blades transversely of the path of travel of said zipper chain, said rectangular cutting member having a predetermined width selected larger than the width of the zipper chain in the chain to be cut, whereby as said cutting assembly is reciprocated towards said base, said cutting edges engage said zipper chain and cut through said chain and said zipper teeth to remove a rectangular section from said zipper chain, including all of the zipper teeth within said section, and to sever said chain across its entire width.

2. The device as defined in claim 1 wherein said plurality of blades comprise said one blade, a pair of elongated relatively straight blades extending in the direction of travel of said zipper chain and secured to said one blade at one end and positioned in parallel spaced relation to each other and an end blade secured to said elongated blades at the ends thereof opposite said one blade and spanning the space between said elongated blades in spaced parallel relation to said one blade, whereby said blades define a generally rectangular cavity therebetween.

3. The device as defined in claim 2 including a spring biased clamping member positioned in said cavity and extending beyond the cutting edges of said cutting blades to engage said zipper chain and hold it against said base immediately prior to the cutting of said chain by said cutting member whereby said zipper chain is held stationary during cutting.

4. The device as defined in claim 3 wherein said spring biased clamping member comprises a generally rectangular block conforming in cross-section to said cavity, and a compression spring operatively engaged between said block and a portion of said cutting assembly.

5. The device as defined in claim 4 wherein said block has an elongated slot therein and inlcuding an elongated pin operatively connected between said elongated cutting blades and extending through said slot to limit movement of said block.

6. The device as defined in claim 5 wherein said cutting edges have relatively small flattened surfaces at the free edges thereof for cutting through said zipper chain upon impact of said cutting assembly against said base with said zipper chain therebetween.

7. A zipper cutting blade assembly for removing a predetermined section of zipper teeth from a zipper chain, said assembly comprising, a plurality of cutting blades having independent cutting edges, said blades being operatively interconnectd in a predetermined relative configuration with the cutting edges thereof cooperating to define a generally rectangular cutting member, the cutting edge of one of said blades extending beyond the rectangular cutting member defined by said one blade and the remainder of said plurality of said blades transversely of the path of travel of the zipper chain, said rectangular cutting member having a predetermined width selected larger than the width of the zipper teeth on the chain to be cut whereby when said cutting edges are urged against a zipper chain positioned between said cutting edges, a rectangular section of the zipper chain is cut therefrom, including all of the zipper teeth within said section, and the chain is severed across its entire width.

8. The cutting assembly as defined in claim 7 wherein said plurality of blades comprises said one blade, a pair of elongated relatively straight blades secured at one end to said one blade and positioned in spaced parallel relation to each other, and an end blade secured to said elongated blades at the ends thereof opposite said one blade and spanning the space between said elongated blades in spaced parallel relation to said one blade, whereby said blades define a generally rectangular cavity therebetween.

9. The cutting assembly as defined in claim 8 including a spring biased clamping member positioned in said cavity and extending beyond the cutting edges of said cutting blades.

10. The cutting assembly as defined in claim 9 wherein said spring biased clamping member comprises a generally rectangular block conforming in cross-section to said cavity, and a compression spring operatively engaged between said block and a portion of said cutting member.

11. The cutting assembly as defined in claim 10 wherein said block has an elongated slot therein and including an elongated pin operatively connected between said elongated cutter blade and extending through said slot to limit movement of said block.

12. The cutting assembly as defined in claim 9 wherein said cutting edges are tapered and have side walls converging toward free cutting surfaces forming said rectangular cutting member.

13. The cutting assembly as defined in claim 12 wherein said free cutting surfaces are relatively flat and have a finite width.

* * * * *